United States Patent
Srinivasan et al.

(10) Patent No.: US 8,234,465 B1
(45) Date of Patent: Jul. 31, 2012

(54) DISASTER RECOVERY USING MIRRORED NETWORK ATTACHED STORAGE

(75) Inventors: Karthikeyan Srinivasan, Westborough, MA (US); Royce T. Dean, Apex, NC (US); Xun Tian, Apex, NC (US)

(73) Assignee: EMC Corporation, Hopkinton, MA (US)

( * ) Notice: Subject to any disclaimer, the term of this patent is extended or adjusted under 35 U.S.C. 154(b) by 514 days.

(21) Appl. No.: 11/616,342

(22) Filed: Dec. 27, 2006

(51) Int. Cl.
*G06F 12/16* (2006.01)

(52) U.S. Cl. ......... 711/162; 711/114; 711/161; 714/6.1; 714/6.23

(58) Field of Classification Search .................. 711/114, 711/161, 162; 714/6.1, 6.23
See application file for complete search history.

(56) References Cited

U.S. PATENT DOCUMENTS

| | | | | |
|---|---|---|---|---|
| 7,047,261 B2 * | 5/2006 | Achiwa et al. | ................ | 707/204 |
| 7,209,435 B1 * | 4/2007 | Kuo et al. | ..................... | 370/219 |
| 7,554,997 B1 * | 6/2009 | Schlichter et al. | ............ | 370/402 |
| 2004/0003094 A1 * | 1/2004 | See | ................................ | 709/227 |
| 2004/0236984 A1 * | 11/2004 | Yamasaki | ........................ | 714/6 |

* cited by examiner

*Primary Examiner* — Jae Yu
(74) *Attorney, Agent, or Firm* — Anderson Gorecki & Manaras LLP

(57) ABSTRACT

A system, architecture for initializing and utilizing a mirrored Network Attached Storage (NAS) system is described. The architecture includes a plurality of processing layers that define and control the operation and relationship of component groups in a primary NAS and associated component groups in a secondary NAS. The groups may include, for example, file server groups and disk device groups. The processing layers may include an execution layer, a transaction layer and a storage layer. The modularized architecture of the invention allows NAS systems to be easily apportioned into logical groups at varying levels of granularity with varying relationships. As a result, the component groups are abstracted from their underlying physical characteristics and constraints, thereby enabling complex processes such as initialization, activation and restoration to be performed using simple commands at a command line interface.

12 Claims, 6 Drawing Sheets

| |
|---|
| Name 71 |
| Description 72 |
| UID 73 |
| State 74 |
| Role 75 |
| Condition 76 |
| Recovery Policy 77 |
| Number of Mirrors 78 |
| Mode 79 |
| Owner 80 |
| Mirrored Disks 81 |
| Local Server ID 82 |
| Remote Server ID 83 |
| Mirror Direction 84 |

Figure 4

DISASTER RECOVERY USING MIRRORED NETWORK ATTACHED STORAGE

FIELD OF THE INVENTION

This invention relates generally to Network Attached Storage (NAS) systems and more particularly a method and apparatus for establishing a mirrored NAS and using the mirrored NAS for disaster recovery.

BACKGROUND OF THE INVENTION

Most organizations have a storage system that includes one or more disks or disk arrays for storing file systems for the organization, and one or more file servers which control accesses to the disks. For example, in a Storage Attached Network (SAN) system, external file servers communicate with one or more disk arrays using a Fibre Channel block protocol.

Network Attached Storage (NAS) systems provide an integrated file servers/disk array solution which may be accessed via a traditional Internet Protocol (IP) network, usually via a Local Area Network (LAN) such as the Ethernet. External hosts, also referred to as NAS clients, use file server protocols such as Common Internet File System (CIFS) and Network File System (NFS) to communicate with NAS systems. NAS systems typically comprise a 'front end' that includes one or more file servers and a 'back end' that includes multiple disk arrays to provide single site redundancy. Because NAS systems provide an integrated file server/disk array solution that may be easily attached to an existing IP network, storage capacity may easily be increased by adding additional NAS systems, or adding additional file server and/or disk array components to a NAS system as businesses grow.

Often the reliability of the NAS system is a key factor in the ability of the organizations to service customers. Thus it is critical that many organizations, such as financial institutions and the like include backup and recovery mechanisms that allow the NAS to quickly recover from faults and disasters and to continue operation without loss of client data. Business continuity is a goal of mirrored NAS systems.

Disaster Recovery (DR) is a term that refers to the ability to recover from the loss of a complete site, whether due to natural disaster or malicious intent. Disaster recovery strategies include replication of data and backup/restore procedures. For example, production file systems (i.e. file systems being manipulated by clients) and other disk components may be replicated or backed-up on disks of a secondary system that are geographically separate from a primary NAS. In the event of a disaster at the primary NAS, the copy of the production file system stored in secondary storage may be used to support client applications until the primary NAS is restored. In addition, data movement operations previously performed by failing devices of a primary NAS may be performed by mirrored backup devices in the secondary NAS. Providing mirrored systems in this manner allows business continuity to be achieved during disasters and other failures.

Constructing a NAS having capable of disaster support involves building a secondary NAS that has all the capabilities of the primary NAS and failing over components of the primary NAS to mirrored components of the secondary NAS as needed. For example, failing file servers of the primary NAS can be failed over to standby file servers in the secondary NAS, and accesses to failing storage devices can be failed over to mirrored storage devices. When building the mirrored system, network administrators at the primary and secondary storage locations each manually map components (including file servers and disk devices) of the primary NAS to equivalents in the secondary NAS to create a 'mirror' of the primary NAS. As the primary NAS is used, data from the disk devices are synchronously or asynchronously backed up to the secondary NAS. Each network administrator typically executes scripts at each station to initialize the NAS systems and to perform mappings between primary and secondary components. The scripts that are executed to establish and control mirror relationships are customized to the underlying architecture of the back end storage. As the NAS systems have evolved, the scripts have grown in length, becoming cumbersome and difficult to modify and maintain. In addition, because the scripts are customized to the particular NAS systems, new scripts must be generated to support the different types of NAS systems, each of which have their own particular back-end and/or physical components, architectures, characteristics, operating attributes and protocols. In addition, because the scripts are executed manually and independently by separate administrators at different locations, it is often difficult to verify the accuracy and thoroughness of the mirroring of the primary NAS. Often an error in mapping is not identified until a disaster occurs at the primary NAS, at which point it is too late to remedy the error.

It would be desirable to identify a method and apparatus that would allow mirroring of a primary NAS to be performed with accuracy. It would be desirable if the method and apparatus operated consistently, without regard to the type of underlying back-end storage devices so that a common procedure could be used to provide disaster recovery capabilities across a wide range of systems.

SUMMARY OF THE INVENTION

According to one aspect of the invention, an architecture for establishing and using a mirrored NAS is provided. The architecture includes a plurality of processing layers that define and control the operation and relationship of component groups in a primary NAS and associated component groups in a secondary NAS. The component groups may include, for example, file server groups and storage device groups. The processing layers may include an execution layer, a transaction layer and a storage layer, with the execution layer processing input commands, the transaction layer generating transactions for component groups in response to the input commands and the component groups being identified and controlled in response to the transactions by the storage layer. The modularized architecture of the invention thus allows NAS systems to be easily apportioned into logical groups at varying levels of granularity with varying relationships. As a result, the groups are abstracted from their underlying physical characteristics and constraints, thereby enabling complex processes such as initialization, activation and restoration to be performed using simple commands at a command line interface.

The architecture also includes a plurality of processes that are invoked via commands input at a command line interface. The processes share access to storage data structures which store information relating groups of the primary NAS to groups of the secondary NAS. The processes perform functions on the groups in accordance with the commands entered at the command line interface. The commands include an initialization command, for initializing group relationships between the primary and secondary storage devices and primary and secondary storage processing devices. An activation command is provided to fail over groups from the primary NAS to the secondary NAS as well as to transition client support from the primary NAS to the secondary NAS. A restore command is provided to fail back groups from the secondary NAS to the primary NAS and to restore client access to the primary NAS.

These and other aspects of the invention will now be described with regard to the attached Figures, wherein like numerals on different pages refer to like elements.

BRIEF DESCRIPTION OF THE FIGURES

FIG. 4 is a diagram of an exemplary data structure for a device group of the present invention;

DETAILED DESCRIPTION

Figure 1:
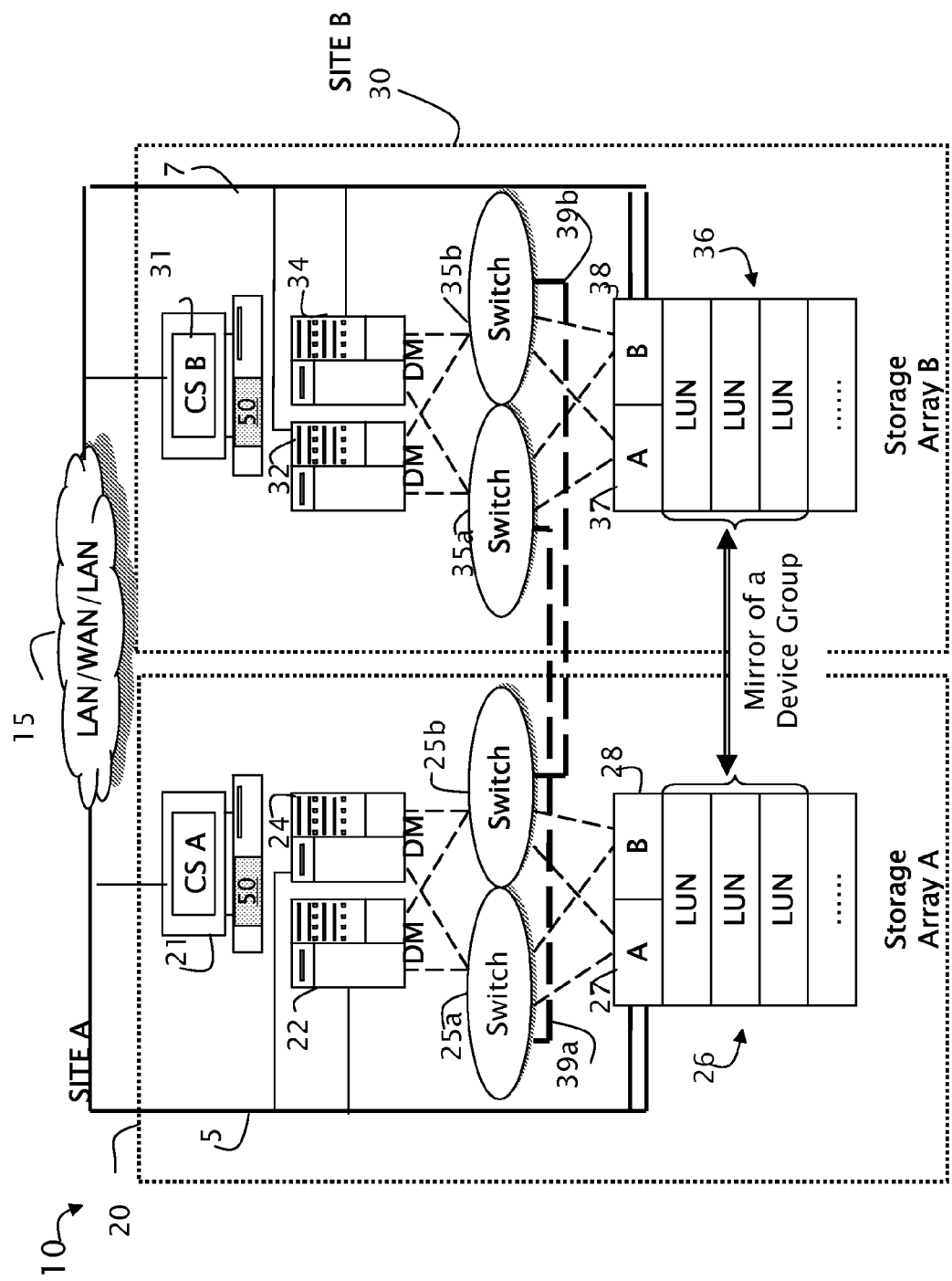
FIG. 1 is a block diagram of a mirrored NAS storage system including mirroring capability architected according to the present invention.

FIG. 1 is a block diagram that illustrates exemplary storage components that may be included in a mirrored Network Attached Storage (NAS) system 10 architected according to the present invention. The NAS system 10 includes a primary NAS 20 and a secondary NAS 30. As mentioned above, Network Attached Storage (NAS) is a term used to describe a complete NAS which is designed to be attached to a traditional data network such as the LANs 5, 7 and WAN 15.

Clients coupled to the LANS, 5, 7 or the WAN 15 may access files via on a NAS system using file system protocols which are layered on top of TCP/IP protocols of the traditional data network. For example, an exemplary file system protocol for use in managing NAS includes the Network File System (NFS). NFS is a protocol suite developed and licensed by Sun Microsystems™ which allows different makers of computers running different operating systems to share files and disk storage. NFS allows remote hosts to mount file systems over a network and interact with those file systems as though they are mounted locally. Other exemplary file systems include Common Internet File System (CIFS) is a File Sharing Protocol Used in Windows™-Based Networks.

Each NAS system includes a front end file server and a back-end comprising one or more disk arrays 26. In one embodiment, the NAS system may be Celerra® Server provided by EMC²® Corporation of Hopkinton Mass., which includes one or more front end Data Mover devices (DMs) 22 and 24 and a back-end comprising a highly available disk array subsystem connected via fibre channel ports 27 and 28.

The file server DMs control the movement of data from the disk arrays to the network in response to NFS/CFIS commands received on the LANs 5, 7. The DMs communicate with the fibre channel ports 27 and 28 using Fibre Channel connections, indicated by dashed lines in FIG. 1. Fibre Channel is a serial, gigabit-speed network technology primarily used for storage networking. Fibre Channel switches, such as switches 25a and 25b may advantageously be provided between the storage processors of the disk array and the DMs.

Modern disk/storage arrays are managed by integrated high performance processors. The control station communicates with the disk array management processor over the IP network 5 or the Fibre Channel connection. The control station 21 may be a control station that allows a network administrator to monitor and control the NAS 20. According to one aspect of the invention, the control station includes mirroring logic 50 for relating the primary NAS to the secondary NAS, controlling fail over to the secondary NAS and controlling fail back to the primary NAS. It should be noted that although the control stations are shown coupled by an IP network, it is not a requirement that an IP network be used, and other embodiments wherein the control stations are directly attached are considered equivalents.

In FIG. 1 the disks of array 26 are assigned Logical Unit Numbers (LUNs). A LUN can be used to refer to an entire physical disk, or a subset of a larger physical disk or disk volume. The physical disk or disk volume could be an entire single disk drive, a partition (subset) of a single disk drive, or disk volume from a RAID controller comprising multiple disk drives aggregated together for larger capacity and redundancy. LUNs therefore represent a logical abstraction between the physical disk device/volume and the applications.

Dedicated Mirroring links 39a and 39b couple the primary and secondary NAS systems. The Mirroring Links 39a and 39b (in one embodiment implemented as Fibre Channel links) are used to forward data from the primary NAS to the secondary NAS to maintain consistency between the contents of the disk arrays of the two devices.

In FIG. 1, NAS system 30 is a mirrored version of NAS system 20. It can be seen that NAS 30 includes components that mirror those of NAS 20; for example NAS 30 includes file server DMs 32 and 34, fibre channel ports 37 and 38, Fibre Channel switches 35a and 35b and disk array 36. The NAS 30 is provided to support the clients of the primary NAS 20 in the event of a disaster or other failure of the primary NAS 20. For this reason, the NAS 30 is typically geographically separated from primary NAS 20.

The primary NAS 20 stores one or more production file systems, where a production file system is the file system that is modified by a production client (also known as a production host). Thus the production file system is the file system that is currently being modified by the client. A file system is data structure which stores and organizes computer files and the data they contain to make it easy to find and access. Each file system thus maps a clients' data to the particular disk that stores the data.

The secondary NAS 30 stores a synchronous or asynchronous copy of the production file systems stored by NAS 20. In the event of a disaster or other failure, the production host may continue to operate using the copy of the production file system that is stored in the secondary NAS. The transition of the production host from using the primary NAS to using the secondary NAS is referred to as a 'failover.' A failover may be activated seamlessly so that a production host may have no knowledge that a failover has occurred. When the primary NAS has recovered from the failure, the operation of the primary NAS is restored, and client support is failed back to the primary NAS.

In order to support seamless failover and failback, an accurate copy of the file system must be maintained. One method of maintaining an accurate copy of the file system is to ensure that the components and organization of the secondary NAS replicate that of the first NAS; thus the secondary NAS should include standby file servers and mirroring disk devices with at least the capability of the primary NAS. Errors or omissions to the replication may result in interruption or lost data during the failover.

As mentioned above, in the prior art a network administrator at each of the control stations exchanged communications and manually mapped the primary NAS components to the secondary NAS components.

As it is known in the art, there are a variety of different disk array architectures, or back ends, each of which has different physical characteristics, operating characteristics and protocols. For example, EMC2 Corporation provides a variety of different disk arrays to support low end, mid-range and high end customer needs. The disk arrays include Symmetrix® disk arrays, Symmetrix DMX® disk arrays, and Clarion disk arrays. Each of the disk arrays has its own unique architecture and operating characteristics. Historically, individual scripts were executed to mirror different types of disk arrays.

The present invention removes the need for customized scripts by providing an architecture and command line interface that may be used to accurately mirror a storage back-end of any type. According to one aspect of the invention, a command line interface includes an initialization command that can be used to identify primary NAS components that require mirroring, and to identify potential candidates in the secondary NAS that are capable of mirroring the particular component. The initialization command and methods of the present invention therefore ensure that the storage devices of the primary NAS are mirrored with accuracy and that appropriate standby file servers are provided.

According to another aspect of the invention one or more of the primary NAS components are apportioned into consistency groups. As will become more evident in the below description, grouping of the components facilitates failover, failback and information gathering. According to another aspect of the invention, an activate command is provided for failing over one or more components of the primary NAS to its counterpart in the secondary NAS. According to a further aspect of the invention, a restore command is provided which enables client operations to failed back to the primary NAS from the secondary NAS.

Each of the commands utilizes data that is stored in data structures to execute their associated functions. The data structures include fields and values that are largely independent of the type of disk array that is being accessed, although some array specific data may advantageously be stored to allow initialization, activation and restoration processes for control purposes. Thus, although the data that is included in the data structure is retrieved from the disk arrays in different manners, the resulting data structure may be used by a common set of commands to provide disaster recovery support, regardless of the underlying structure of the back end. The command line interface thus provides a framework by which a mirrored NAS may easily be constructed, used and monitored.

In one embodiment, the commands for constructing, using and monitoring a disaster recovery capable NAS are input by an administrator at control station 31. The input of a command at the control station initiates one or more command associated processes. The command associated processes will differ according to the command, and may include communication processes, information gathering processes, architecting processes, failover processes and failback processes, to name a few. Although the commands will be described as text that is input at a command line interface of the control station, it will be appreciated that other equivalents methods of providing commands at the control station (pull down menus, etc.) may be substituted herein by those of skill in the art.

Figure 2:
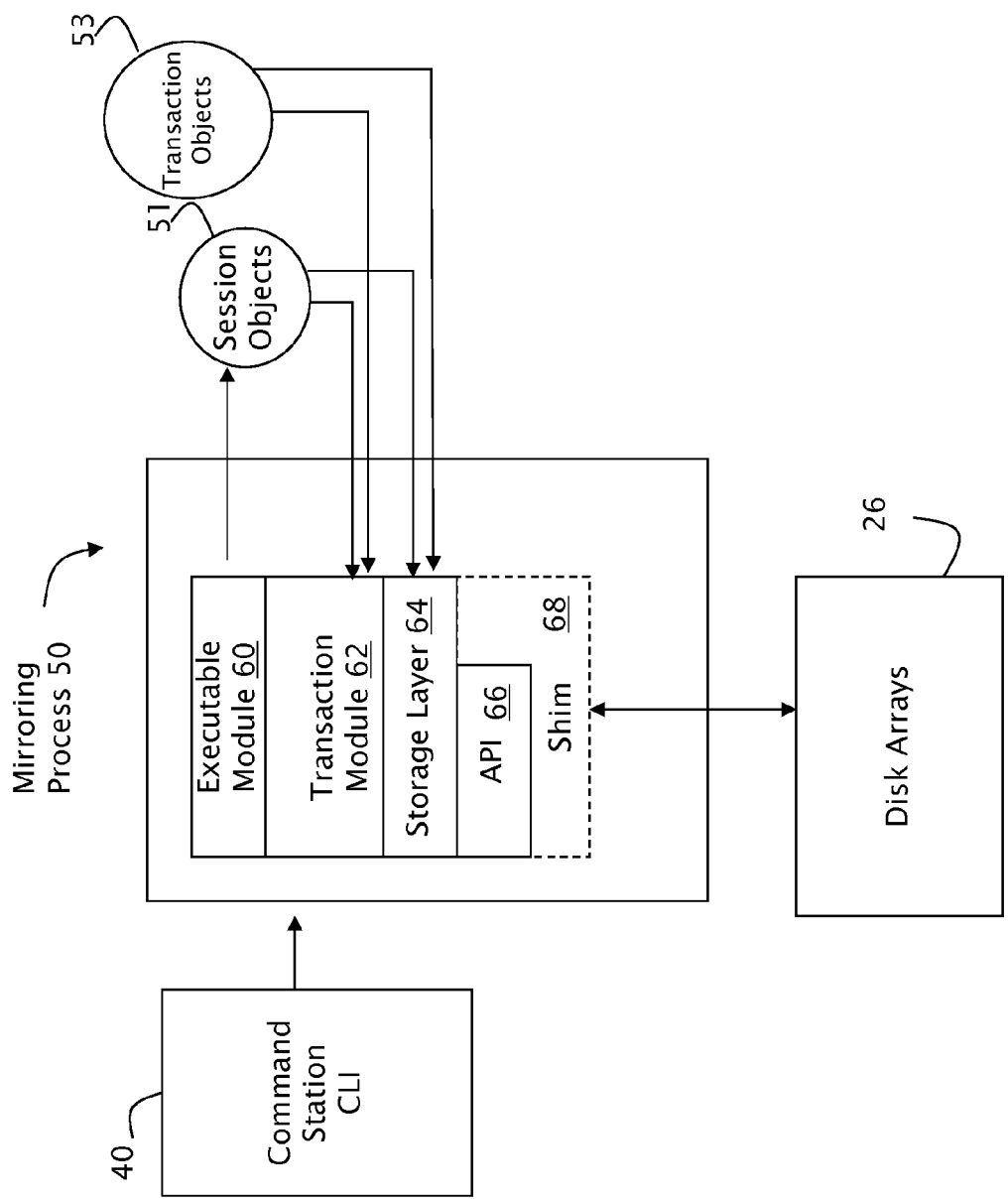
FIG. 2 is a diagram illustrating several processing layers of a mirroring architecture of the present invention.

Referring now to FIG. 2, one embodiment of a mirroring process 50 that may be used to initialize and utilize a mirrored NAS system is shown to be comprised of a layered framework of software modules and data structures. In one embodiment the software modules are implemented in an object oriented programming language, such as Java, C++ and Eiffel. The mirroring process 50 includes an execution component 60, a transaction module 62 and storage related data structures 64. The mirroring process 50 controls which signals are forwarded to the disk arrays and when they are forwarded, to cause specific transactions to occur at the file servers and disk arrays. Thus the mirroring process 50 generates signals, in response to input at the CLI, that are forwarded to the disk arrays using the process API 66 to control the associated disk arrays. In one embodiment the signals from API 66 are forwarded directly to the disk array 26. In an alternate embodiment, a 'shim' 68 may be provided between the API 66 and the disk array 26, where the shim comprises software and/or hardware to provide translation of signals to control the disk array 26. The shim 68 is shown in dashed lines to indicate that may not be required if the native array supports grouping of devices.

The execution module 62 includes software for parsing and validating input received from the command line interface 40. In one embodiment, the execution module 60 collects all user inputs and builds session objects 51 and transaction objects 53. Session objects and transaction objects are used by the transaction module 64 and storage layer 66 to perform operations such as shutting down a remote site, enabling client access on failover, and saving server database information for restore purposes, among other functions.

The transaction module 62 is coupled to the execution module, and includes program code for performing a variety of transactions associated with the transaction objects 53, including initialization of the mirrored relationship, creation of device groups, identification of standby servers, generation of user accounts at the secondary site, and activation and restore operations.

The storage layer 64 store component objects for different storage component/component groups. Thus component objects may be associated with a disk device or array or a file server. The data structure embodies all the information required to perform the activate/restore operations when the source site is unavailable due to disaster. Disk device groups may include disk devices in a single array or may include disk devices that span multiple disk arrays. All operations on devices in a device group must be executed atomically by the disk arrays.

According to one aspect of the invention, one or more LUNs in a disk device group may be allocated to a Consistency Group (CG). The CG allows an administrator to define a set of LUNs, when mirrored, to always fracture as a group in order to maintain their associated secondary images in a consistent, logically recoverable state. In the event of a disaster, failover of the CG is performed on a group level. Disk device group tables in the storage data structures 64 identify LUN membership to facilitate initialization, activation and restoration processes.

Initialization Processes

Figure 3:
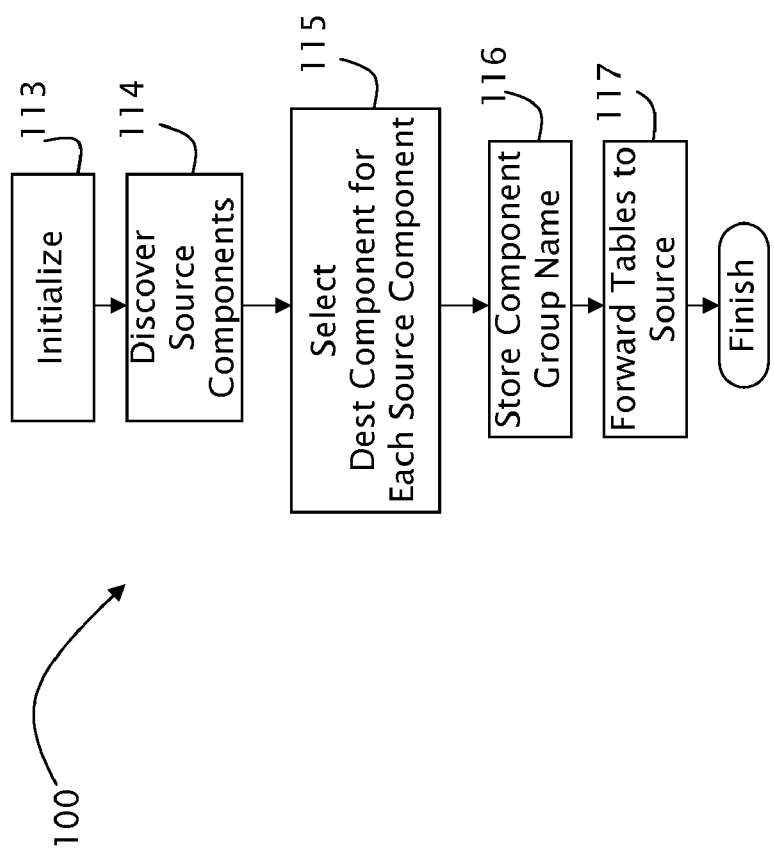
FIG. 3 is a flow diagram illustrating exemplary steps that may be performed during an exemplary initialization process.

Referring now to FIG. 3 exemplary steps that may be performed to initialize a NAS will now be described. The initialization process populates relational information (primary NAS to secondary NAS component mappings, etc.) in the storage layer 64 for use in a disaster recovery operation. Prior to initialization of the mirroring and standby relationships, certain steps are performed 'locally' (at each site) to ensure that the respective sites are prepared for initialization. For example, it is verified at each system location that all disk volumes are coupled to the Mirroring Links and are in a synchronized state, and that appropriate versions of program code including mirroring features are included at each location. The source NAS may further identify which devices, arrays, etc. are to be parts of a mirror device group, where the mirror group is a device group that is mirrored at secondary storage.

Once local setup is complete, the mirroring initialization process starts. It should be noted that there are many mirroring configurations that can be supported by the present invention. In an Active→Passive configuration, the primary NAS actively manages file systems and the main purpose of the secondary NAS is to provide backup for the primary NAS. In an Active→Active configuration, both the primary and secondary NAS systems directly service requests from different clients, and they serve as back-up to each other. The terms 'source' NAS and a 'destination' NAS will be used in various places below when describing various processes that are performed by the systems. The source NAS is the NAS that stores the production file system, while the destination NAS is the NAS that stores the copy of the production file system. Thus, for an Active→Passive configuration, the source NAS system is a primary NAS and the destination NAS is the secondary NAS. For an Active→Active configuration, the initialization process is executed twice; one with the primary NAS as the source and secondary NAS as the destination and once with the secondary NAS as the source and the primary NAS as the destination.

To initialize a mirrored NAS, at step 113 an administrator at the destination NAS initiates a mirror initialization by entering the command 'Initialize' (or an equivalent thereof) at the command line of the control station. When the Initialize command is received at the control station of the destination NAS, at step 115 the destination system 'discovers' the mirrored device configuration of the source NAS by querying the source NAS. The source returns mirror relationships for the disk components and standby relationships for the file server components to the destination NAS. The initialization process creates component groups that includes the pair of components in the mirrored or standby grouping. A remote component group may be generated as a sub-class of the component group. The destination NAS stores this information in a component group table (in storage layer 64) at step 116 and returns the information to the source at step 117.

Once the mirroring relationship is established, file system consistency can be maintained by copying changes in the production file system to the back-up devices, forwarding changes on the mirror link to the destination NAS, and using the component group relationship information at the destination storage NAS to update the mirroring and standby components. There are many ways known to those of skill in the art for monitoring and maintaining file system consistency, and the present invention is not limited to any particular method.

According to one embodiment of the invention, the state of the component groups can be periodically monitored using an information command. Referring now briefly to FIG. 3, several exemplary attributes of a disk device group object 70 which may be provided in response to an information command are shown. It should be understood that these attributes are merely meant to be representative of attributes that may be useful; device groups may have greater or fewer than the attributes shown in FIG. 3. In addition it should be appreciated that certain target NAS implementations may have different detailed attributes, and thus the attributes that are selected to characterize device groups are a matter of design choice. Thus the attributes shown in FIG. 3 are meant only as examples of types of information that may be stored for later by higher layers of the mirroring architecture; the present invention is not limited to the inclusion of any specific attribute, and other attributes that may be of interest should be considered as equivalents hereto.

The attributes include a number of attributes that identify the group, such as a name attribute 71, a description attribute 72, a The User Identifier (UID) attribute 73 and an owner attribute 80. The attributes may also include a variety of attributes that provide an indication as to the state of the group, such as a state attribute 74 to indicate a consistency state of the NAS, a role attribute 75 to indicate whether the NAS is a Primary or Secondary, and a condition attribute 76 to indicate whether the NAS is Active or Passive. The attributes may also include a number of policy attributes which are related to the recovery policy of the group. Such policy attributes may include, for example, a Recovery policy attribute 77 to indicate whether recover is Automatic or manual, and a mode attribute 79 to indicate whether the NAS mirrors are synchronous or asynchronous. In addition, several mirroring characteristic attributes may be included, such as a number of mirrors attribute 78, a mirrored disk attribute 81 to list mirrored disks known to the NAS, a local Identifier 82 of the local storage array and a remote identifier 83 of the destination storage array, a mirror direction attribute 84 to indicate whether the mirroring is local→remote or remote→local. Accordingly it can be seen that the data structures may be used to store dynamic attribute data associated with a component groups for use by the activation and restoration processes of the invention.

Activation Processes

When a failure or other disaster is detected at the source NAS, or if it is time to perform routine maintenance or test the operation of the mirror NAS, an activation process of the present invention is initiated by a network administrator at the control station of the destination NAS. The activation process transitions operation of the failed component groups to mirrored or standby associates in the destination NAS for recovery and business continuity purposes.

Figure 5:
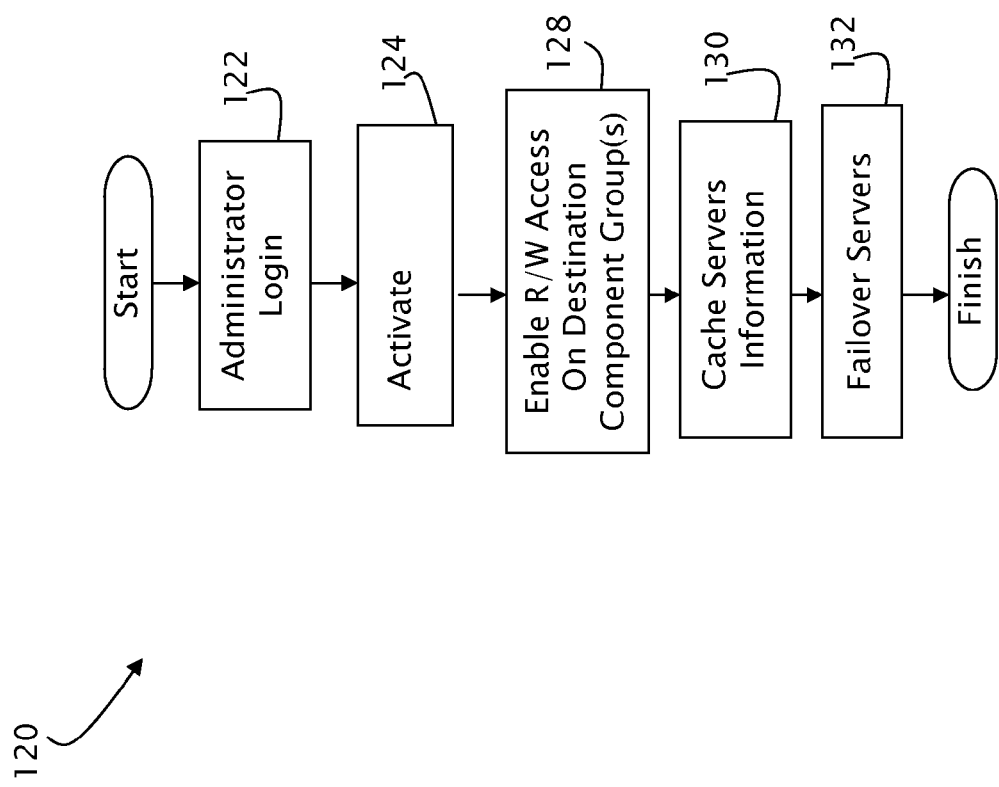
FIG. 5 is a flow diagram illustrating exemplary steps that may be performed in an activation process of the present invention.

FIG. 5 is a flow diagram that illustrates exemplary steps that may be performed by an activation process 120 to activate a mirrored NAS architected according to the present invention. At step 122 a network administrator at the destination NAS logs into the mirroring process 50, for example using the administrator password identified during initialization. At step 124 the network administrator enters the 'Activate' command (or equivalent thereof) at the command line interface of the control station. The Activate determines the source NAS and destination NAS to be used in the failed over in response to the data structures of the component groups. The component groups associated with the source NAS are evaluated to determine which disk device groups and file server data movers are to be failed over. The activate operation swaps the primary-secondary role for all disk devices identified as being in a mirror consistency group by making secondary images R/W in the destination NAS. At step 128 R/W accesses are enabled on the destination groups, and host I/O access are re-directed to the destination devices.

At step 130, DM server information is cached and at step 132, and standby servers at the destination take over the tasks of the source DM servers.

Restoration Process

Figure 6:
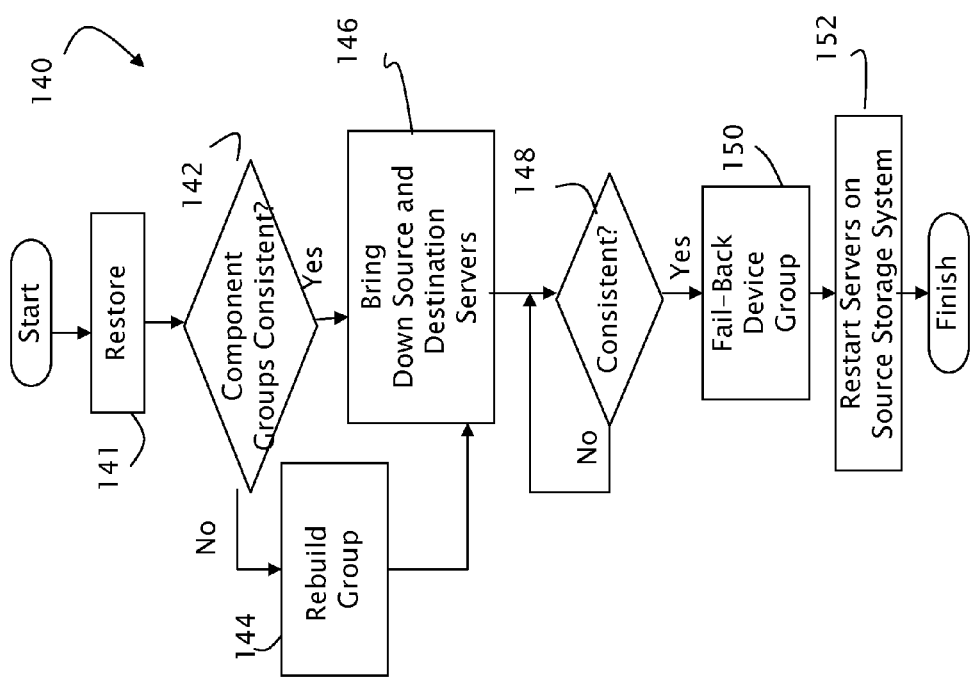
FIG. 6 is a flow diagram illustrating exemplary steps that may be performed in a restore process of the present invention.

Restoration is performed when the source NAS has been repaired and it is time to fail back, when routine maintenance is completed or when activation testing is completed. It is desirable to restore the NAS to a fully synchronized and mirrored state. However, because modifications are made to the production file system while the primary storage was off-line, certain steps need to be taken to bring the mirrored system to a fully consistent state. These steps will now be described with regard to an exemplary restoration process 140 shown in the flow diagram of FIG. 6.

At step 141 the network administrator at the destination control station logs into the mirroring process 50, and initiates a 'Restore' command (or equivalent thereof) at the command line interface. First the source disk devices are synchronized with data on the destination disk devices. At step 142 it is determined whether synchronization is complete and component groups are consistent. If not, synchronization continues at step 144 until it consistency is attained.

Once the NAS systems are synchronized (or prior to complete synchronization), at step 146 both the local and remote file servers are brought down. The NAS systems are again examined for consistency and any further synchronization is performed at step 148. At step 150, the destination servers are brought up as secondary servers, and the source servers are restored to primary server status. The direction of data flow across the mirror links is restored from source→destination. The servers are then restored on the source side, including any synchronization changes.

Accordingly a disaster recovery framework has been shown and described that is portable and adaptable for use in a variety of environments having different storage needs and hardware. A modularized architecture provides the ability to easily apportion file servers, disks and arrays into logical groups at varying levels of granularity with varying relationships. As a result, component groups may be abstracted from their underlying physical characteristics and constraints, thereby enabling complex processes to be performed using simple commands at a command line interface.

Having described various embodiments of the invention, it will be appreciated that many of the above figures are flowchart illustrations of methods, apparatus (systems) and computer program products according to an embodiment of the invention. It will be understood that each block of the flowchart illustrations, and combinations of blocks in the flowchart illustrations, can be implemented by computer program instructions. These computer program instructions may be loaded onto a computer or other programmable data processing apparatus to produce a machine, such that the instructions which execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem The above description and figures have included various process steps and components that are illustrative of operations that are performed by the present invention. However, although certain components and steps have been described, it is understood that the descriptions are representative only, other functional delineations or additional steps and components can be added by one of skill in the art, and thus the present invention should not be limited to the specific embodiments disclosed. In addition it is understood that the various representational elements may be implemented in hardware, software running on a computer, or a combination thereof.

While the invention is described through the above exemplary embodiments, it will be understood by those of ordinary skill in the art that modification to and variation of the illustrated embodiments may be made without departing from the inventive concepts herein disclosed. Accordingly, the invention should not be viewed as limited except by the scope and spirit of the appended claims.

The invention claimed is:

1. A device in a Network Attached Storage (NAS) system includes a computer readable medium having mirroring program code stored thereon, the mirroring program code including:
    an execution module operative when executed to parse a mirroring command received at a command line interface of the Network Attached Storage (NAS) system;
    a transaction module, coupled to the execution module, operable when executed to generate a transaction in response to the mirroring command, wherein the transaction affects a relationship between at least one component group in a source NAS system and an associated component group in a destination NAS system, including instructions that discover source NAS components that require mirroring, and instructions that discover potential candidates in the destination NAS that are capable of mirroring the discovered source NAS components;
    a data structure for storing relational information associated with groups of components in the source and destination NAS systems; and
    instructions that prompt establishment of mirroring between the source NAS and destination NAS based on the data structure.

2. The device of claim 1, wherein the mirroring command is selected from a group of mirroring commands including a initialization command, an activate command and a restore command.

3. The device of claim 1 wherein the component group includes at least one disk array.

4. The device of claim 1 wherein the component group includes at least file server.

5. The device of claim 1 wherein the data structure stores, for each component group, a component group data structure including an identifier of a first component associated with the component group in the source system and a second component associated with the component group in the destination system.

6. The device of claim 3 wherein the component group data structure stores a direction of mirroring of the source and destination NAS systems.

7. A method of activating a destination component in a destination Network Attached Storage (NAS) system to mirror a source component in a source NAS system includes the steps of:
- receiving a mirror activation command at a command line interface of the destination NAS system;
- accessing a component object associated with the source component, the component object including an identifier of a destination component to be used to mirror the source component;
- discovering source NAS components that require mirroring;
- discovering potential candidates in the destination NAS that are capable of mirroring the discovered source NAS components; and
- servicing source component NAS operation using the destination component, including prompting establishment of mirroring between the source NAS and destination NAS based on the data structure.

8. The method of claim 7 wherein the source component and the destination component comprise disk arrays.

9. The method of claim 7 wherein the source component and the destination component comprise file servers.

10. The method of claim 7 wherein the mirror activation command includes a group identifier identifying a group of a plurality of source components for which destination components should be activated.

11. A method of restoring operation of a source component group in a source storage system includes the steps of:
- receiving a mirror restore command at a command line interface of a destination storage system that is servicing operations of the source component group;
- in response to the restore command, synchronizing the source component group with a mirrored destination component group and transitioning a servicing of source component group requests from the destination component group to the source component group by accessing a component object indicative of mirroring between ones of the source component group and ones of the destination component group, wherein the component object includes an indication of a relationship between the source component group and the destination component group resulting from discovering source components that require mirroring and discovering potential candidates in the destination component group that are capable of mirroring the discovered source components.

12. A storage system comprising:
- a primary storage system comprising a first control station and a first plurality of components including a first file server and a first plurality of disk devices;
- a secondary storage system comprising a second control station and a second plurality of components including a second file server and a second plurality of disk devices;
- mirroring program code, stored in a computer readable medium of the first and second control stations and operable when executed in response to a mirroring command input at a command line interface to perform at least one of an initialization, activation and restoration process, wherein the mirroring commands are provided independent from a type of the components used in each of the primary and secondary storage systems, and include instructions for discovering primary storage system components that require mirroring, discovering potential candidate components in the secondary storage system that are capable of mirroring the discovered primary storage system components, and instructions that prompt establishment of mirroring between the source NAS and destination NAS based on the data structure.

* * * * *